US012212949B2

(12) United States Patent
Yoo et al.

(10) Patent No.: US 12,212,949 B2
(45) Date of Patent: Jan. 28, 2025

(54) METHOD AND APPARATUS FOR AMBISONIC SIGNAL REPRODUCTION IN VIRTUAL REALITY SPACE

(71) Applicant: Electronics and Telecommunications Research Institute, Daejeon (KR)

(72) Inventors: Jae-hyoun Yoo, Daejeon (KR); Kyeongok Kang, Daejeon (KR); Yong Ju Lee, Daejeon (KR); Dae Young Jang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 92 days.

(21) Appl. No.: 18/090,090

(22) Filed: Dec. 28, 2022

(65) Prior Publication Data

US 2023/0224659 A1 Jul. 13, 2023

(30) Foreign Application Priority Data

Jan. 13, 2022 (KR) ........................ 10-2022-0005443
Nov. 7, 2022 (KR) ........................ 10-2022-0147177

(51) Int. Cl.
*H04S 3/00* (2006.01)

(52) U.S. Cl.
CPC ........... *H04S 3/002* (2013.01); *H04S 2420/11* (2013.01)

(58) Field of Classification Search
None
See application file for complete search history.

(56) References Cited

U.S. PATENT DOCUMENTS

| | | | | |
|---|---|---|---|---|
| 10,932,081 | B1 * | 2/2021 | Raghuvanshi .......... | H04S 7/308 |
| 2015/0154965 | A1 | 6/2015 | Wuebbolt et al. | |
| 2019/0239015 | A1 * | 8/2019 | Schevciw ............... | H04S 3/006 |

FOREIGN PATENT DOCUMENTS

| | | |
|---|---|---|
| JP | 5921678 | 5/2016 |
| JP | 6888172 | 6/2021 |
| KR | 10-2020-0074757 | 6/2020 |
| WO | 2021/018378 | 2/2021 |

OTHER PUBLICATIONS

"5G; 3GPP Virtual reality profiles for streaming applications (3GPP TS 26.118 version 15.0.0 Release 15)", ETSI, Oct. 2018, pp. 1-67.
Kronlachner, Matthias et al., "Spatial transformations for the enhancement of Ambisonic recordings", Jan. 2014, pp. 1-5.

* cited by examiner

*Primary Examiner* — Kenny H Truong
(74) *Attorney, Agent, or Firm* — KILE PARK REED & HOUTTEMAN PLLC

(57) ABSTRACT

Provided is a method of reproducing an ambisonic signal in a virtual reality (VR) space. The ambisonic signal reproduction method may include receiving an ambisonic signal, mapping the ambisonic signal to channels localized on a sphere according to an equivalent spatial domain (ESD) standard corresponding to an order of the ambisonic signal, and performing a sound field reproduction in the VR space based on the channels localized on the sphere.

11 Claims, 5 Drawing Sheets

| Index $j$ | $\theta_j^{(N=1)}$ | $\varnothing_j^{(N=1)}$ |
|---|---|---|
| 1 | 0 | 0 |
| 2 | 1.910633 | 0 |
| 3 | 1.910633 | 2.094395 |
| 4 | 1.910633 | -2.0944 |

FIG. 3

| Index $j$ | $\theta_j^{(N=2)}$ | $\varnothing_j^{(N=2)}$ |
|---|---|---|
| 1 | 0 | 0 |
| 2 | 2.361073 | 0 |
| 3 | 1.207589 | -1.95668 |
| 4 | 1.207589 | 1.956682 |
| 5 | 2.415178 | -1.95668 |
| 6 | 1.561039 | -3.14159 |
| 7 | 2.415178 | 1.956681 |
| 8 | 1.325668 | 0.687124 |
| 9 | 1.325667 | -0.68712 |

FIG. 4

| Index *j* | $\theta_j^{(N=3)}$ | $\varnothing_j^{(N=3)}$ |
|---|---|---|
| 1 | 0 | 0 |
| 2 | 0.854098 | 0 |
| 3 | 2.031969 | 1.119907 |
| 4 | 2.605106 | -0.25283 |
| 5 | 1.078622 | 1.155586 |
| 6 | 1.736608 | 2.040481 |
| 7 | 2.031968 | -1.38118 |
| 8 | 1.736609 | 0.270692 |
| 9 | 1.56888 | -2.20417 |
| 10 | 0.917087 | 2.297267 |
| 11 | 0.917087 | -2.80293 |
| 12 | 1.763476 | 3.010956 |
| 13 | 2.649852 | 2.154919 |
| 14 | 1.568881 | -0.63529 |
| 15 | 0.953962 | -1.41973 |
| 16 | 2.458122 | -2.46809 |

FIG. 5

METHOD AND APPARATUS FOR AMBISONIC SIGNAL REPRODUCTION IN VIRTUAL REALITY SPACE

CROSS-REFERENCE TO RELATED APPLICATION

This application claims the benefit of Korean Patent Application No. 10-2022-0005443 filed on Jan. 13, 2022 and Korean Patent Application No. 10-2022-0147177 filed on Nov. 7, 2022 in the Korean Intellectual Property Office, the entire disclosures of which are incorporated herein by reference for all purposes.

BACKGROUND

1. Field of the Invention

One or more embodiments relate to a technical field of processing an audio signal.

2. Description of the Related Art

Types of audio signals used by an audio signal processing apparatus for rendering in a virtual reality (VR) space include a channel signal, an object signal (e.g. object-based audio signal), and a high order ambisonic (HOA) signal. A channel signal is a signal having a format in which a number of speakers is identical to a number of reproduction channels, as in a 5.1 channel signal, a 10.2 channel signal, and a 22.2 channel signal. An object-based audio signal is an audio signal in which an audio signal of a specific sound, such as a voice of a singer and a piano sound, exists separately. An HOA signal is an audio signal configured with many B-format channels such as W, X, Y, and Z obtained from spherical harmonics. In a VR application environment, there are cases in which the three types of audio signals described above are all utilized and there is a rendering issue about how to provide such diverse audio signals to a listener.

Ambisonics, a scene-based audio rendering method among the three types of audio signals described above, is most widely used because a sound field of a general content scene is most easily generated and reproduced with ambisonics. MPEG-I, which is currently being standardized, includes a method of providing VR audio by using an ambisonic signal, and most VR content production environments such as Facebook prefer ambisonics as an audio rendering method for VR content production. However, in order to obtain a precise ambisonic signal, an order of the ambisonic signal needs to be increased, which increases spherical harmonics and makes audio signal processing complex.

SUMMARY

Embodiments provide technology for effectively reproducing an ambisonic signal with a small amount of computations in a listener-centric environment such as a virtual reality (VR) space.

The technical goal obtainable from the present disclosure is not limited to the above-mentioned technical goal, and other unmentioned technical goals may be clearly understood from the following description by those having ordinary skill in the technical field to which the present disclosure pertains.

According to an aspect, there is provided an ambisonic signal reproduction method of reproducing an ambisonic signal in a VR space. The ambisonic signal reproduction method may include receiving an ambisonic signal, mapping the ambisonic signal to channels localized on a sphere according to an equivalent spatial domain (ESD) standard corresponding to an order of the ambisonic signal, and performing a sound field reproduction in the VR space based on the channels localized on the sphere.

The sphere may be a unit sphere having a radius of 1 m.

A center of the sphere may be a location of an origin of a world coordinate system (WCS).

A center of the sphere may be set to be identical to a location of a listener in the VR space.

The channels may be localized on the sphere in a way that a channel of index 1, among the channels, faces a front of the listener in the VR space.

According to an aspect, there is provided an ambisonic signal reproduction apparatus for reproducing an ambisonic signal in a VR space. The ambisonic signal reproduction apparatus may include a memory storing instructions and a processor electrically connected to the memory and configured to execute the instructions. The processor may be configured to perform a plurality of operations when the instructions are executed by the processor, wherein the plurality of operations may include receiving an ambisonic signal, mapping the ambisonic signal to channels localized on a sphere according to an ESD standard corresponding to an order of the ambisonic signal, and performing a sound field reproduction in the VR space based on the channels localized on the sphere.

Additional aspects of embodiments will be set forth in part in the description which follows and, in part, will be apparent from the description, or may be learned by practice of the disclosure.

According to embodiments, there is a technical effect of effectively reproducing an ambisonic signal with a small amount of computations in a listener-centric environment such as a VR space.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a diagram illustrating information of an equivalent spatial domain (ESD) representation of a 1st ambisonic signal having channels W, X, Y, and Z according to an embodiment;

FIG. 4 is a diagram illustrating information of an ESD representation of a 2nd ambisonic signal according to an embodiment;

FIG. 5 is a diagram illustrating information of an ESD representation of a 3rd ambisonic signal according to an embodiment;

DETAILED DESCRIPTION

Figure 1:
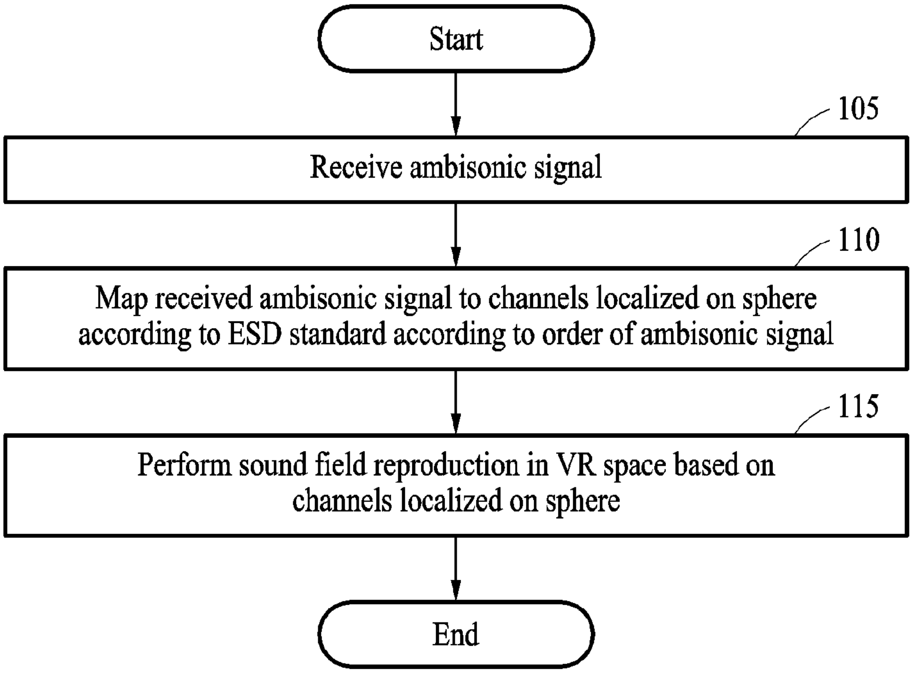
FIG. 1 is a diagram illustrating a flowchart for describing an embodiment of a method of reproducing an ambisonic signal in a virtual reality space according to an embodiment.

The following detailed structural or functional description is provided as an example only and various alterations and modifications may be made to the examples. Here, the embodiments are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which embodiments belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like constituent elements and a repeated description related thereto will be omitted.

FIG. 1 is a diagram illustrating a flowchart for describing an embodiment of a method of reproducing an ambisonic signal in a virtual reality space according to an embodiment;

The method of reproducing an ambisonic signal begins with receiving an ambisonic signal in operation 105. An ambisonic signal refers to a signal according to an audio signal processing method of processing a sound field by using directional component information represented by spherical harmonics. An ambisonic signal is classified as a scene-based signal, different from a traditional channel-based signal such as a 5.1 channel or a 10.2 channel and an object-based signal which processes a sound source signal as individual tracks, but an ambisonic signal is sometimes classified as a channel-based signal because an ambisonic signal has signals of channels W, X, Y, and Z. A three-dimensional ambisonic signal may be represented as shown in Equations 1 and 2 below.

$$p(r,\theta,\phi,\omega)=\sum_{n=0}^{\infty}\sum_{m=-n}^{n}A_{nm}(k)b_n(k)\Gamma_{nm}P_n^m(\cos\theta)e^{im\phi} \quad \text{[Equation 1]}$$

$$\Gamma_{nm}=\sqrt{\frac{2n+1}{4\pi}\frac{(n-m)!}{(n+m)!}} \quad \text{[Equation 2]}$$

Here, n and m respectively denote an order and a degree, $A_{nm}(k)$ denotes a Fourier coefficient, $b_n(k)$ denotes a radial function for which a spherical Bessel function or a Hankel function is used, $\Gamma_{nm}$ denotes a normalization constant, $P^m{}_n(x)$ denotes an Associated Legendre function, $e^{im\varphi}$ denotes azimuthal harmonics, and $\Gamma_{nm}P^m{}_n(\cos x)e^{im\varphi}$ are together called spherical harmonics.

Figure 2:
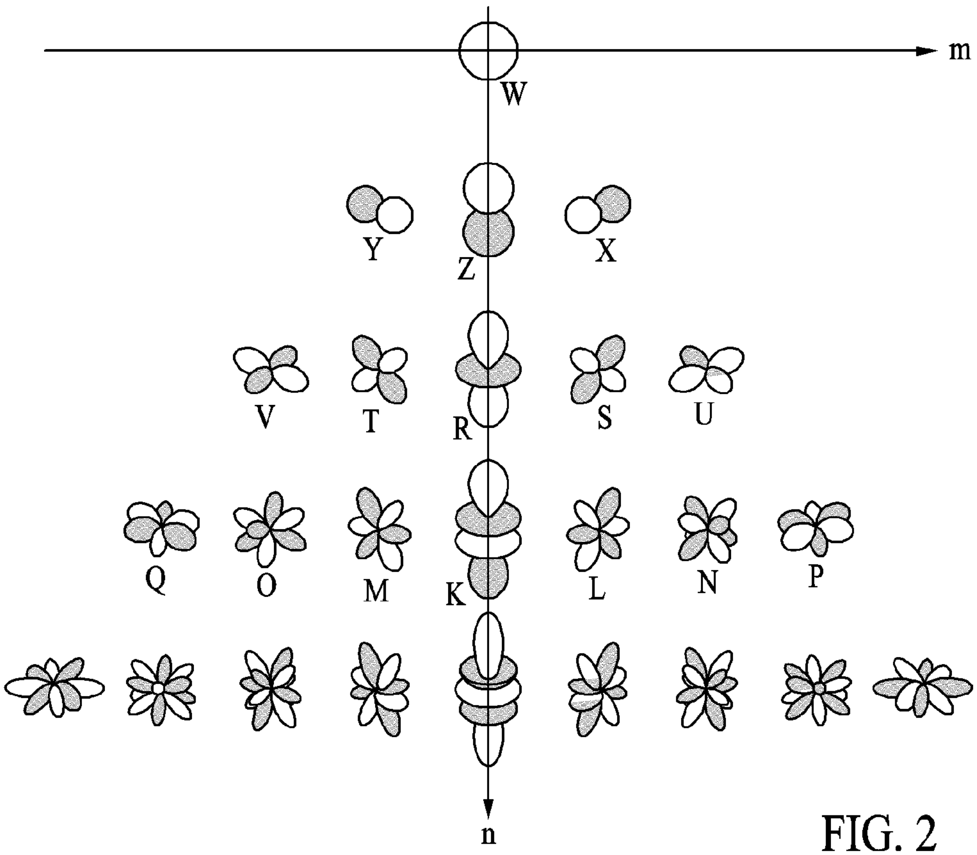
FIG. 2 is a diagram illustrating spherical harmonics of an ambisonic signal up to a 4th order according to an embodiment.

When an ambisonic signal is used to represent a sound field, information of spherical harmonics from 0 to infinite order needs to be used. For example, spherical harmonics up to a 4th order of an ambisonic signal is schematically shown in FIG. 2. As shown in FIG. 2, there are 2n+1 kinds of spherical harmonics of each order n and $(N+1)^2$ channels up to a specific order N.

Figure 6:
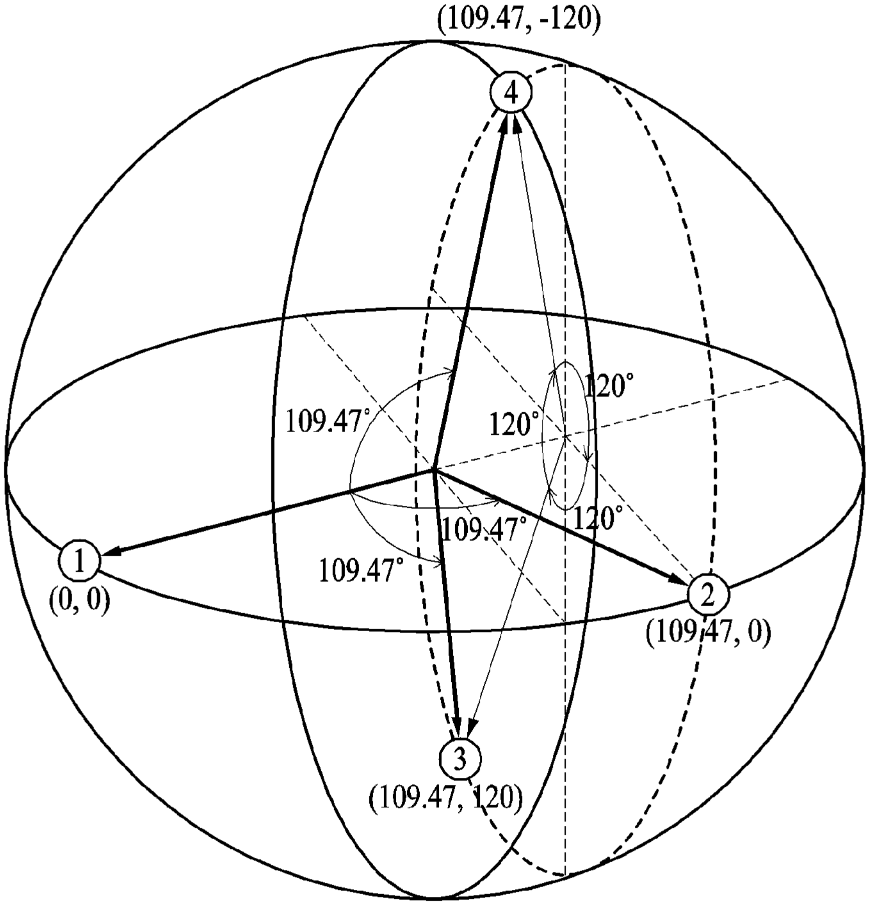
FIG. 6 is a diagram illustrating an example of mapping a 1st ambisonic signal to channels localized on a unit sphere having a radius of 1 m according to an embodiment.

In operation 110, the ambisonic signal is mapped to channels localized on a sphere according to an equivalent spatial domain (ESD) standard (ETSI TS 126 260 V15.0.0 (2018 October)) according to an order of the ambisonic signal. FIG. 3 shows information of an ESD representation of a 1st ambisonic signal having channels W, X, Y, and Z. FIG. 4 shows information of an ESD representation of a 2nd ambisonic signal. FIG. 5 shows information of an ESD representation of a 3rd ambisonic signal. In FIGS. 3 to 5, index j denotes a channel number, N denotes an order, θ denotes a vertical angle represented in radians, and ϕ denotes a horizontal angle represented in radians. θ and ϕ together define spherical coordinates on a unit sphere having a radius of 1 m. As described above, there are "4" channels in a 1st ambisonic signal, "9" channels in a 2nd ambisonic signal, and "16" channels in a 3rd ambisonic signal. For example, by converting information of an ESD representation of a 1st ambisonic signal of FIG. 3 into degrees, the 1st ambisonic signal may be mapped to virtual speakers (channels) distributed on a unit sphere having a radius of 1 m. This is schematically shown in FIG. 6. In an embodiment, a center of a sphere in FIG. 6 may be a location of an origin of a world coordinate system (WCS), which is a location of a center of a screen in a VR space. When information of an ESD representation is used as described above, an ambisonic signal may be mapped to a space without additional processing.

Figure 7:
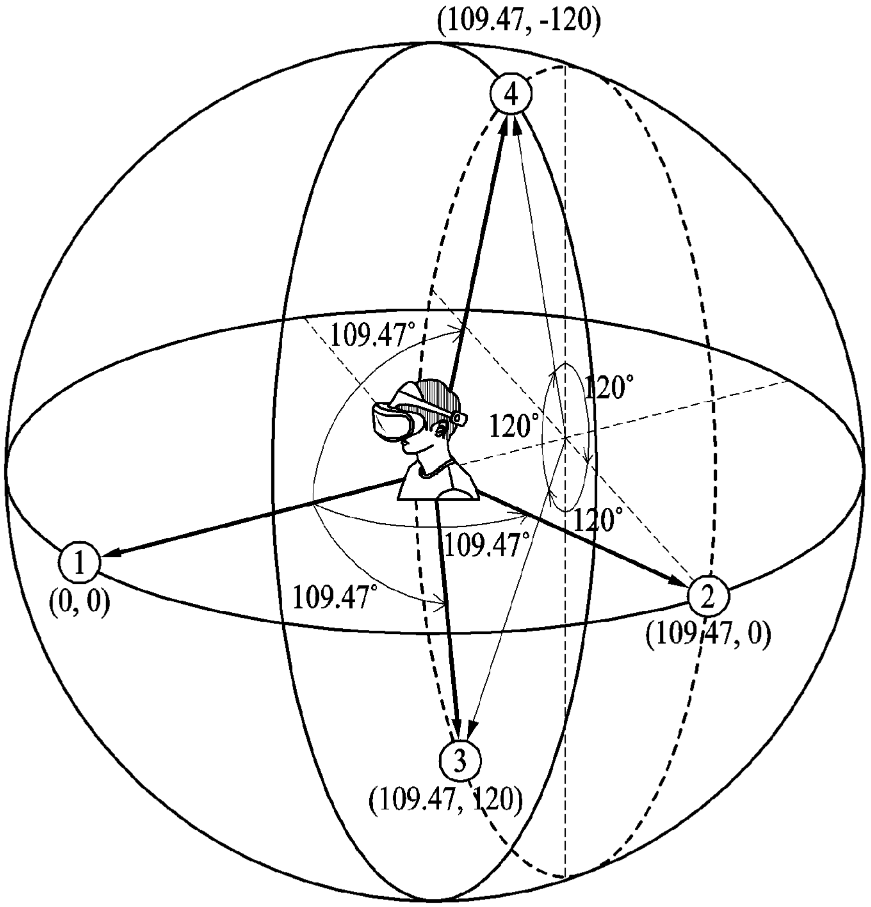
FIG. 7 is a diagram illustrating an example of localizing channels on a sphere in a way that a channel of index 1 of a 1st ambisonic signal faces a front of a listener in a VR space according to an embodiment.

Mapping 1st to 3rd ambisonic signals of FIGS. 3 to 5 to channels distributed on a sphere by using information of an ESD representation is described above, but embodiments of mapping an ambisonic signal to channels distributed on a sphere by using ESD information of various orders, such as a 4th order and a 5th order, are also possible. Since an ambisonic signal reproduced according to such embodiments is often reproduced as a background sound in a space due to many channels, such a background sound always needs to be reproduced constantly, regardless of a location and an oriented direction of a listener. Considering this, in an embodiment, the center of the sphere of FIG. 6 may be set to be identical to a location of a listener in a VR space. In such an embodiment, channels may be localized on a sphere in a way that a channel (θ=0, ϕ=0) of index 1 faces a front of a listener in a VR space. This is schematically shown in FIG. 7. When sound localization is set for each channel so that a location 1 m away from a front of a listener is always θ=0, ϕ=0 in a channel as described above, regardless of information of a location and an oriented direction of a listener which changes in real time in a VR system, it is possible to provide a reproduction of a constant high order ambisonic (HOA) sound field to the listener.

In operation 115, a sound field reproduction is performed in a VR space based on channels localized on a sphere. In an embodiment, sound field reproduction may be performed by utilizing only sound sources in a specific direction or in a direction in which an actual sound source exists, among sound sources arranged on a unit sphere. Sound field reproduction in a VR space may be performed by using one of various methods of providing stereophonic sound. In an embodiment, it is possible to perform sound field reproduction in a VR space based on channels localized on a sphere by using a head-related transfer function (HRTF) method. In an embodiment, it is also possible to reproduce a sound field by upmixing an ambisonic signal to an ESD representation of a higher order or by downmixing an ambisonic signal to an ESD representation of a lower order.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

Embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiment may be recorded in non-transitory computer-readable media including program instructions to implement various operations of the above-described embodiment. The media may also include, alone or in combination with the program instructions, data files, data structures, and the like. The program instructions recorded on the media may be those specially designed and constructed for the purposes of an embodiment, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiment, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An ambisonic signal reproduction method of reproducing an ambisonic signal in a virtual reality (VR) space, the ambisonic signal reproduction method comprising:

receiving an ambisonic signal;

mapping the ambisonic signal to channels localized on a sphere according to an equivalent spatial domain (ESD) standard corresponding to an order of the ambisonic signal; and performing a sound field reproduction in the VR space based on the channels localized on the sphere.

2. The ambisonic signal reproduction method of claim 1, wherein the sphere is a unit sphere having a radius of 1 m.

3. The ambisonic signal reproduction method of claim 1, wherein a center of the sphere is a location of an origin of a world coordinate system (WCS).

4. The ambisonic signal reproduction method of claim 1, wherein a center of the sphere is set to be identical to a location of a listener in the VR space.

5. The ambisonic signal reproduction method of claim 4, wherein the channels are localized on the sphere in a way that a channel of index 1, among the channels, faces a front of the listener in the VR space.

6. A non-transitory computer-readable storage medium storing instructions that, when executed by a processor, cause the processor to perform the method of claim 1.

7. An ambisonic signal reproduction apparatus for reproducing an ambisonic signal in a virtual reality (VR) space, the ambisonic signal reproduction apparatus comprising:
- a memory storing instructions; and
- a processor electrically connected to the memory and configured to execute the instructions,
- wherein the processor is configured to perform a plurality of operations when the instructions are executed by the processor,
- wherein the plurality of operations comprises:
  - receiving an ambisonic signal;
  - mapping the ambisonic signal to channels localized on a sphere according to an equivalent spatial domain (ESD) standard corresponding to an order of the ambisonic signal; and
  - performing a sound field reproduction in the VR space based on the channels localized on the sphere.

8. The ambisonic signal reproduction apparatus of claim 7, wherein the sphere is a unit sphere having a radius of 1 m.

9. The ambisonic signal reproduction apparatus of claim 7, wherein a center of the sphere is a location of an origin of a world coordinate system (WCS).

10. The ambisonic signal reproduction apparatus of claim 7, wherein a center of the sphere is set to be identical to a location of a listener in the VR space.

11. The ambisonic signal reproduction apparatus of claim 10, wherein a channel of index 1, among the channels localized on the sphere, is localized to face a front of the listener in the VR space.

* * * * *